United States Patent [19]

Rosheim

[11] 4,194,437
[45] Mar. 25, 1980

[54] HYDRAULIC SERVO MECHANISM

[76] Inventor: Mark E. Rosheim, 1851 Chester, Apt. No. 4, Royal Oak, Mich. 48072

[21] Appl. No.: 884,903

[22] Filed: Mar. 9, 1978

[51] Int. Cl.² ............................ F01C 9/00; F15B 7/00
[52] U.S. Cl. ........................................ 92/120; 92/122; 60/567
[58] Field of Search ................... 92/122, 120; 60/325, 60/533, 567

[56] References Cited

U.S. PATENT DOCUMENTS

| | | | |
|---|---|---|---|
| 2,346,820 | 4/1944 | Cosler | 74/335 |
| 2,975,766 | 3/1961 | Henry | 92/122 |
| 3,583,283 | 6/1971 | Cunningham et al. | 91/35 |
| 3,973,469 | 8/1976 | Humen | 92/122 |
| 4,045,958 | 9/1977 | Wells | 92/120 |

*Primary Examiner*—Paul E. Maslousky
*Attorney, Agent, or Firm*—Merchant, Gould, Smith, Edell, Welter & Schmidt

[57] ABSTRACT

A base structure defining a generally hemispherical seat and a generally spherically shaped body mounted in seating engagement with the seat. The base defines a pair of diametrically opposed guide channels each of which receives a portion of a different one of a pair of trunnions, another portion of each trunnion being received in a first circumferentially extending channel in the body. The body has a second circumferentially extending channel at right angles to the first circumferentially extending channel for sliding and rotating reception of a portion of each of a pair of second trunnions that have other portions each journaled in the base between respective ends of the guide channels and in diametrically opposed relationship. The channels in the body each have circumferentially spaced inner ends that cooperate with respective pairs of the trunnions to define opposite ends of circumferentially extending fluid chambers that longitudinally expand and contract responsive to rotary movements of said body on its center and relative to the base structure. The base structure defines fluid passageways for connection to a source of fluid under pressure and each communicating with a different one of said fluid chambers. A drive arm projects radially outwardly from the body for imparting rotary movements of the body to a device to be driven.

13 Claims, 22 Drawing Figures

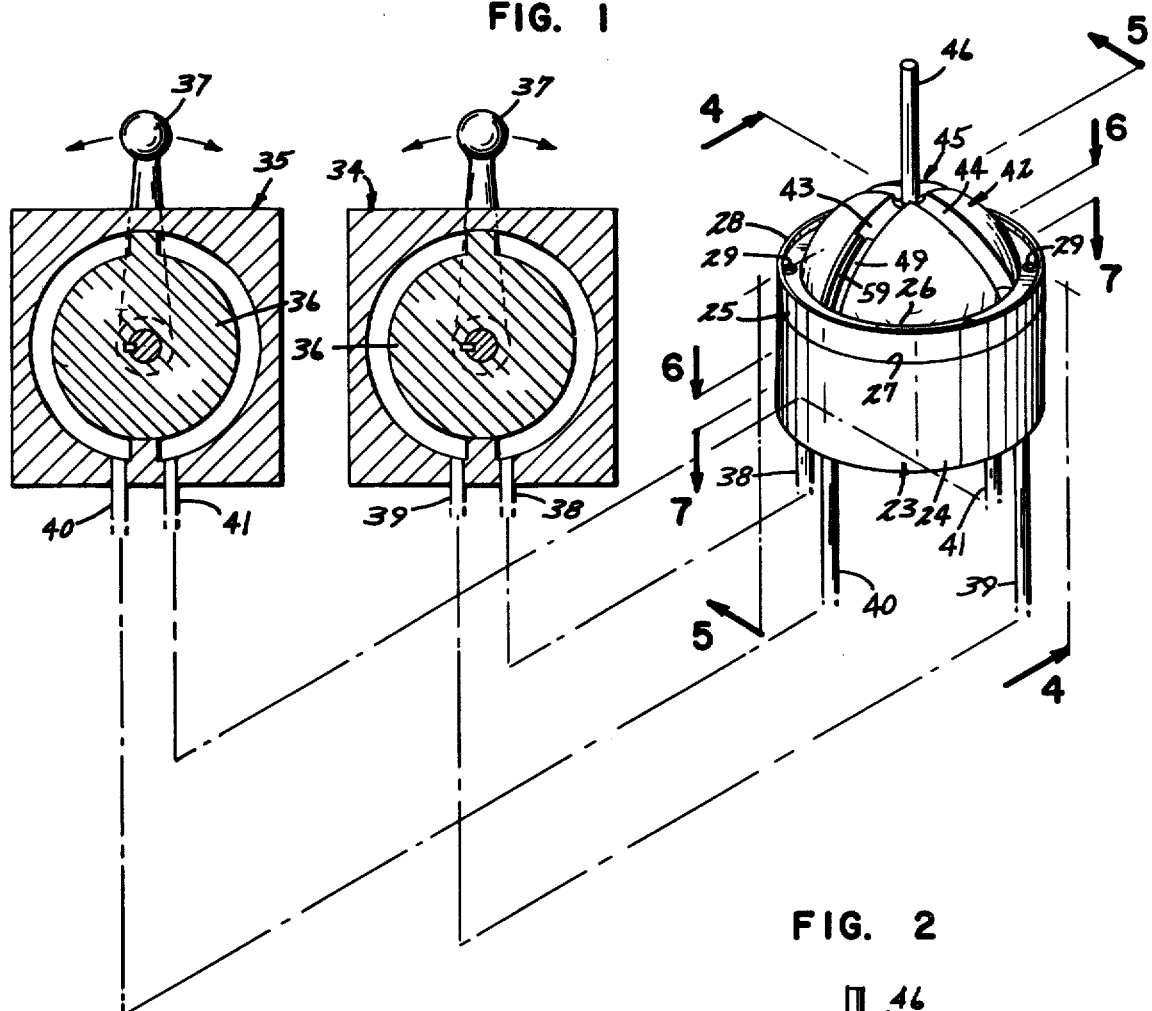

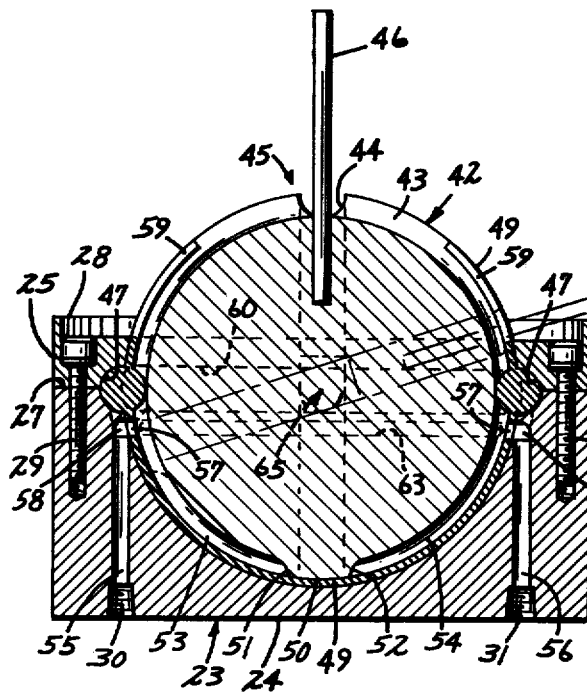
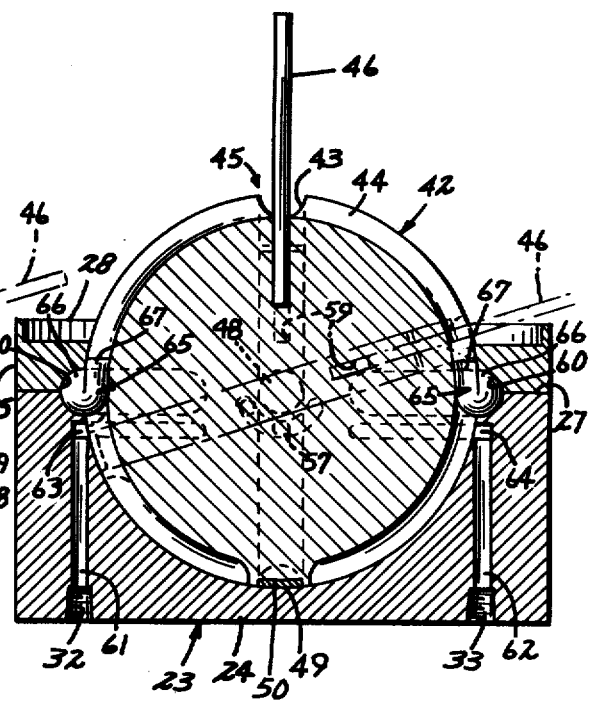
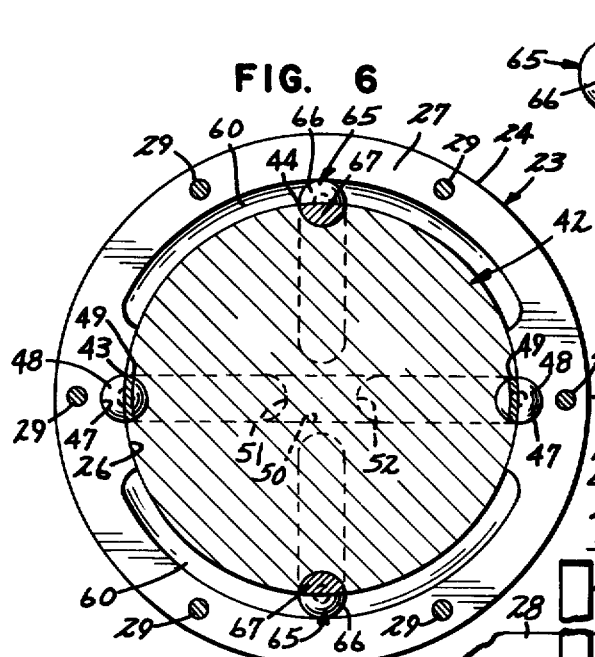
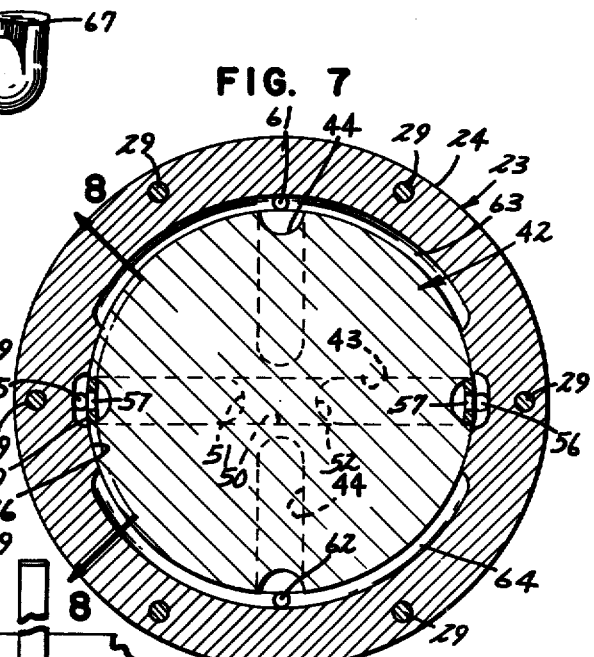
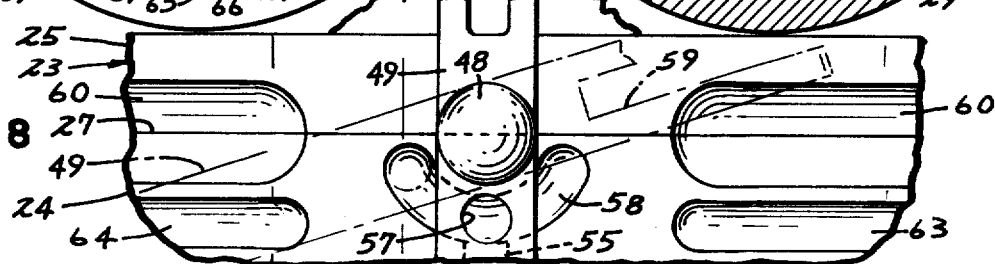

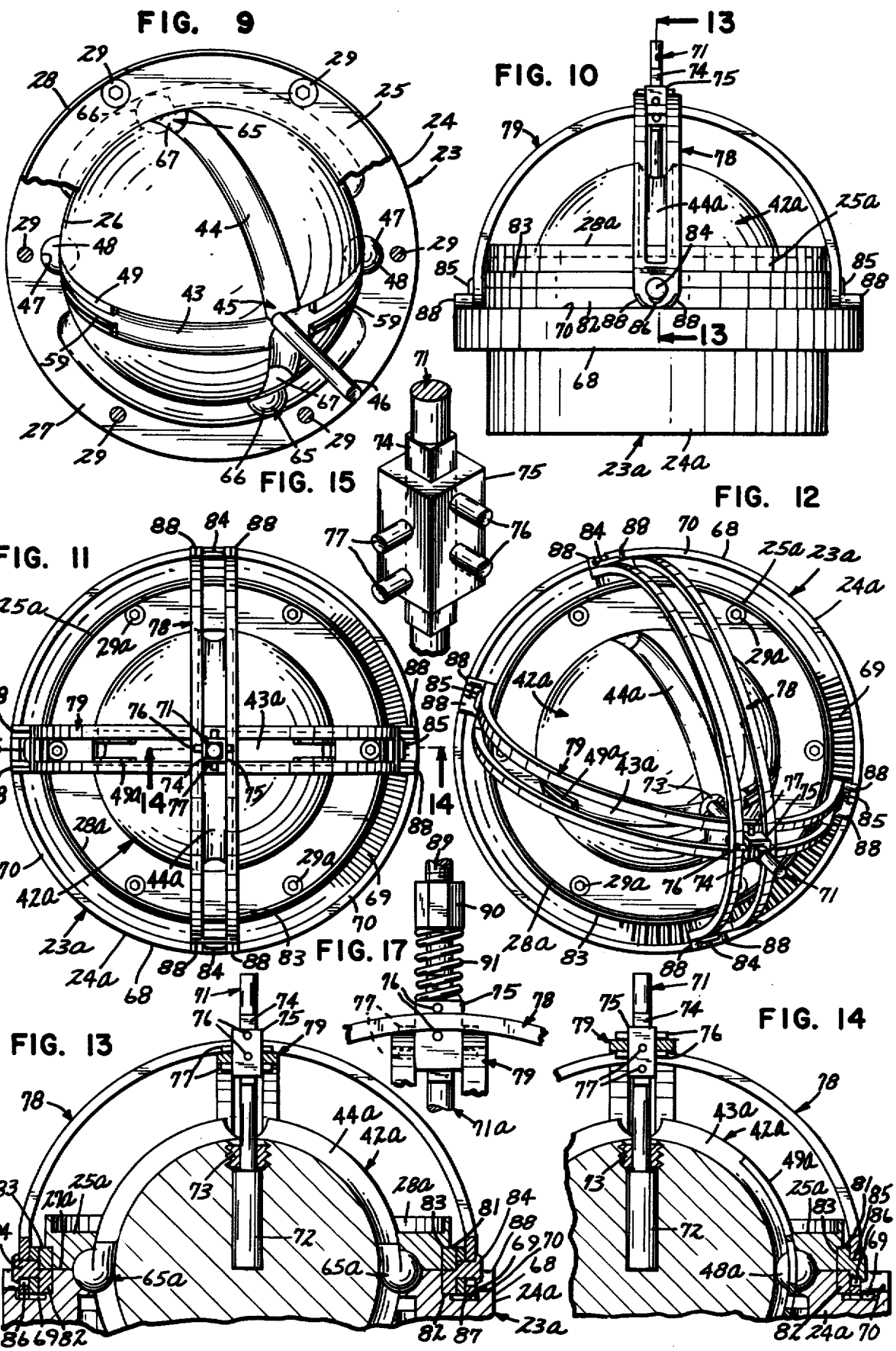

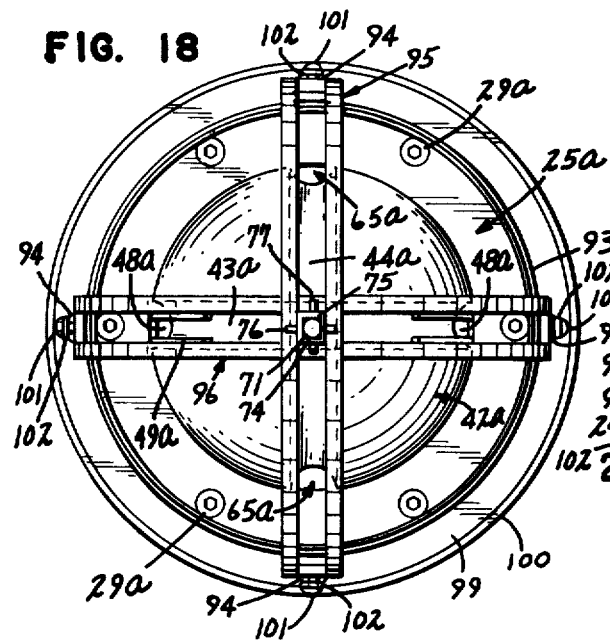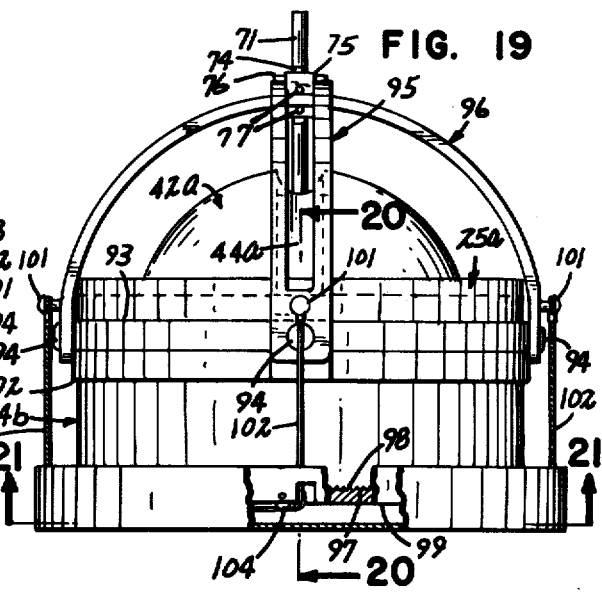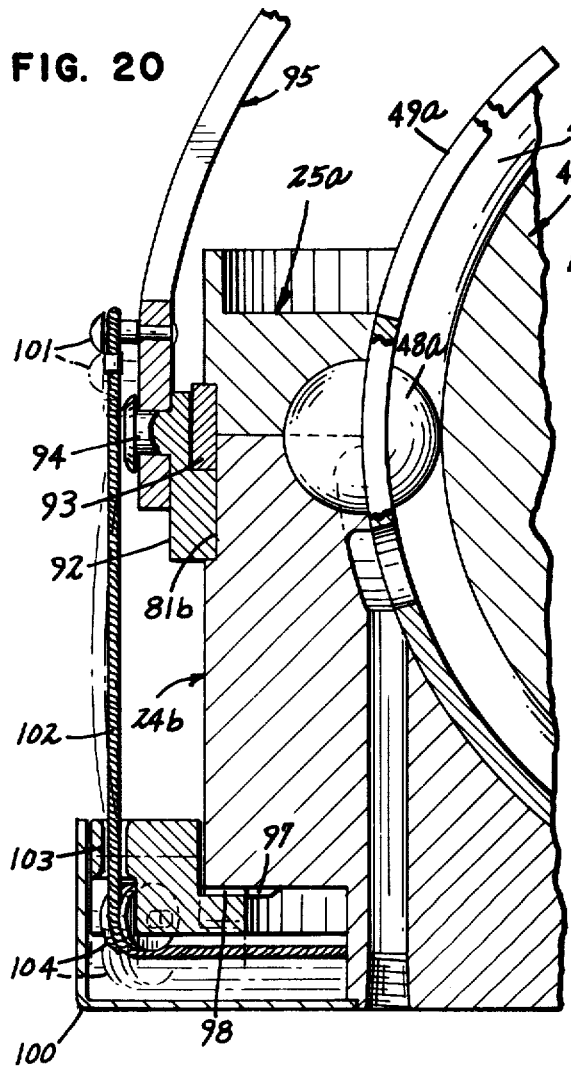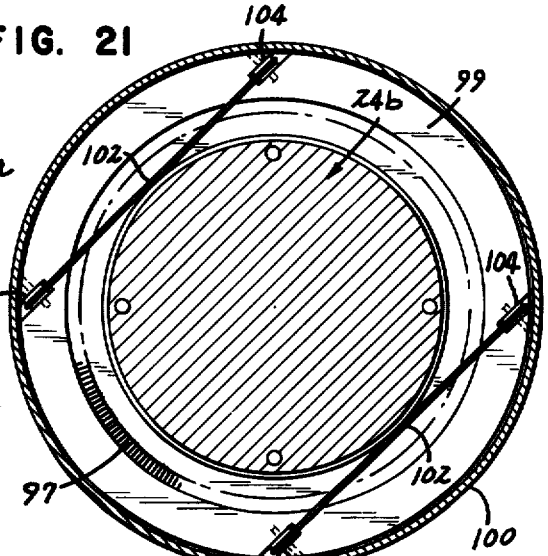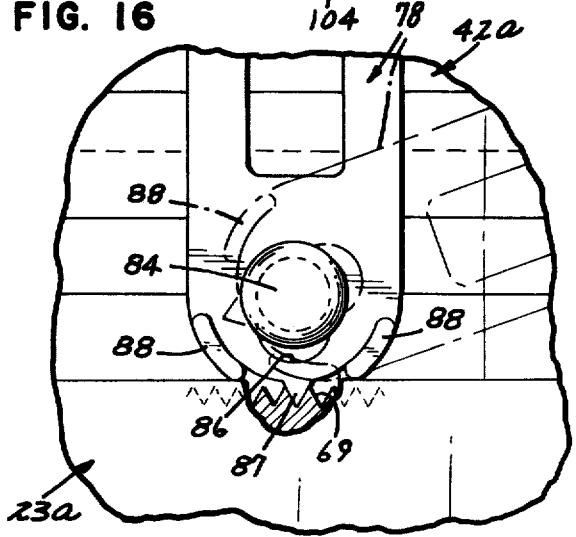

HYDRAULIC SERVO MECHANISM

BACKGROUND OF THE INVENTION

This invention relates generally to fluid pressure servo mechanisms and more specifically to a servo mechanism capable of imparting limited angular movements to a driven device in an infinite number of directions circumferentially about a common center. More particularly, this invention is in the nature of a fluid pressure powered gimbal or type of universal joint which can be connected to devices such as robot teleoperator arms or fingers, multidirectional scanning antennas, solar collector mirrors, construction equipment, movable search lights and other lamps, prosthetics and other devices, for imparting universal angular movements to such devices.

SUMMARY OF THE INVENTION

The fluid servo mechanism of this invention involves a base structure defining a generally hemispherical seat and a pair of opposed radially inwardly opening circumferentially extending guide channels disposed in a plane passing through the radial center of said seat. A generally spherical body is rotatively mounted in seating engagement with said seat and has a pair of intersecting radially outwardly opening channels extending circumferentially of the body and disposed in planes extending through the center of said body and normal to each other. A pair of trunnion elements are mounted in said structure in said first mentioned plane, and have portions thereof disposed in diametrically opposite portions of one of said radially outwardly opening channels. A second pair of trunnion elements have portions disposed in said radially inwardly opening guide channels and other portions disposed in diametrically opposite portions of the other one of said radially outwardly opening channels. The base structure has fluid ports for connection to a source of fluid under pressure, and fluid passageways communicating with different ones of said ports and respective portions of said radially outwardly opening channels.

BRIEF DESCRIPTION OF THE DRAWINGS

FIG. 1 is a view partly in perspective, partly in section and partly diagrammatic, showing the fluid servo mechanism of this invention coupled in a fluid circuit to a pair of pumps;

FIG. 2 is a view in side elevation of a spherical body forming a portion of this invention;

FIG. 3 is a view in bottom plan of the body of FIG. 2;

FIGS. 4 and 5 are axial sections taken on the lines 4—4 and 5—5 respectively of FIG. 1;

FIGS. 6 and 7 are transverse sections taken on the lines 6—6 and 7—7 respectively of FIG. 1;

FIG. 8 is an enlarged fragmentary section taken on the curved line 8—8 of FIG. 7, some parts being removed;

FIG. 9 is a view in top plan, some parts being broken away and some parts being shown in section;

FIG. 10 is a view in side elevation showing a modified form of the invention;

FIG. 11 is a view in top plan of the structure of FIG. 10;

FIG. 12 is a view corresponding to FIG. 11 but showing a different position of some of the parts;

FIG. 13 is an enlarged fragmentary section taken on the line 13—13 of FIG. 10;

FIG. 14 is an enlarged fragmentary section taken on the line 14—14 of FIG. 11;

FIG. 15 is an enlarged fragmentary view in perspective of a drive arm member and guide means therefor of the modified arrangement of FIGS. 10-14;

FIG. 16, sheet 4, is an enlarged fragmentary view of a portion of FIG. 10, some parts being broken away and some parts being shown in section;

FIG. 17, sheet 3, is an enlarged view corresponding generally to a portion of FIG. 13, but showing a further modified form of guide means for the drive arm;

FIG. 18 is a view in top plan of a further modified form of servo mechanism;

FIG. 19 is a view in side elevation of the servo mechanism of FIG. 18, some parts being broken away and some parts being shown in section;

FIG. 20 is an enlarged fragmentary section taken on the line 20—20 of FIG. 19;

FIG. 21 is a transverse section taken on the line 21—21 of FIG. 19; and

FIG. 22, sheet 2, is a view in perspective of one of the trunnion members of this invention.

DETAILED DESCRIPTION OF THE PREFERRED EMBODIMENT

The form of servo mechanism illustrated in FIGS. 1-9 involves a base structure 23 which includes a base member 24 and an annular retainer member 25 that cooperate to define a generally hemispherical seat 26 the center of which lies in the plane of the top surface 27 of the base member 24. As shown in FIGS. 4, 5, 8 and 9, the retainer member is formed to provide an upstanding annular flange 28, and is rigidly secured to the base member 24 by machine screws or the like 29. The flange 28 acts as a retainer for fluid, such as hydraulic liquid, not shown, which may escape from the interior of the base structure. The base member 24 is provided with fluid ports 30, 31, 32 and 33 that are adapted to be operatively connected to one or more sources of fluid under pressure, such as pumps 34 and 35 each having a vane-equipped rotor 36 that is operated by a respective operating handle 37. The pumps 34 and 35, in and of themselves, do not comprise the instant invention. Hence, in the interest of brevity, further detailed showing and description thereof is omitted. It should suffice to state that the fluid ports 30 and 31 are connected to the pump 34 by respective conduits 38 and 39, the fluid ports 32 and 33 being connected to the pump 35 by respective conduits 40 and 41, see FIG. 1.

A generally spherical body 42 is seated in the seat 26 for rotation therein, and is formed to provide a pair of circumferentially extending channels 43 and 44 that intersect at right angles to each other, as indicated at 45 in FIGS. 4 and 5. Diametrically opposite the point of intersection 45, the channels 43 and 44 terminate in spaced relationship to each other, as shown in FIGS. 3-5 and by dotted lines in FIGS. 6 and 7. An elongated drive arm 46 has its inner end embedded in the spherical body 42 and projects radially outwardly therefrom, the drive arm member 46 being adapted to be operatively connected to any desired element, not shown, but to which desired movement is to be imparted.

The base member 24 and retainer member 25 are formed to provide a pair of diametrically opposed hemispherical recesses 47 for reception of a pair of generally spherical trunnion elements 48 that are integrally formed with an arcuate band 49 that extends circumferentially within the channel 43 adjacent the outer spherical surface of the body 42 and in contact with the spherical seat 26. The band 49 slidably moves in a channel 50 in the body 42 between the adjacent ends 51 and 52 of the channel 43, as shown in FIGS. 3-5. The channel 43 cooperates with the band 49 and trunnion elements 48 to provide circumferentially extending fluid chambers 53 and 54 between the channel ends 51 and 52 respectively and their respective trunnions 48, see particularly FIG. 4. Fluid passages 55 and 56 in the base member 54, and openings 57 in the arcuate band 49 connect the ports 30 and 31 to the fluid chambers 53 and 54 respectively. With reference to FIGS. 7 and 8, it will be noted that the ends of the fluid passages 55 and 56 are formed to provide fluid passage portions 58 that communicate with the openings 57 in the band 49, for a purpose which will hereinafter become apparent. The outer end portions of the band 49 are formed to provide circumferentially elongated notches 59 for reception of the drive arm member 46.

The base and retainer members 24 and 25 respectively are formed to provide a pair of opposed guide channels 60 that are cross sectionally semicircular and that extend circumferentially of the seat 26. With reference to FIGS. 5, 6 and 8, it will be seen that the guide channels 60 terminate in circumferentially spaced relationship to the recesses 47, and are disposed in the same plane as the recesses 47 relative to the radial center of the seat 26 and the center of the spherical body 42. Further, with reference to FIGS. 4, 5, 7 and 8, it will be seen that the base member 24 is provided with fluid passages 61 and 62 that extend from respective ports 32 and 33 to a pair of circumferentially extending fluid passage portions 63 and 64 respectively that are disposed in spaced parallel relationship to respective ones of the guide channels 60. Further, it will be noted that the guide channels 60 as well as the fluid passage portions 63 and 64 intersect diametrically spaced portions of the channel 44 in the body 42.

A pair of trunnions 65 have generally hemispherical portions 66 that are rotatively and slidably disposed each in a different one of the guide channels 60, and have generally semicylindrical stem portions 67 that are slidingly fitted in the body channel 44. See FIG. 9 wherein the trunnions 65 have slid within the channels 60 in a counter-clockwise direction from the position shown in FIG. 6. Preferably, the trunnions 65 as well as the trunnion elements 48 with their arcuate band 49 are of a suitable material forming a liquid seal in the channels 43 and 44 and guide channels 60 while permitting relatively free movement of the body 42 circumferentially of the channels 43 and 44.

By rotating the rotor 36 of the pump 34 in either direction, fluid, such as hydraulic liquid, is introduced under pressure to a selected one of the chambers 53 and 54, to cause the body 42 to rotate in a selected direction about its center and in a direction circumferentially of the channel 43. By similarly rotating the rotor 36 of the pump 35, fluid under pressure may be delivered to the channel 44 between the inner ends thereof and the trunnions 65, whereby to rotate the body 42 in a direction circumferentially of the channel 44. Thus, the body 42 may be caused to partake of a compound rotary movement in all directions about its center as shown by full and broken lines in FIGS. 4, 5 and 8, a different position thereof being shown in FIG. 9. When the body 42 is rotated to an extreme position shown in FIGS. 4, 5 and 8, fluid under pressure moves from one of the fluid passages 61, 62 through one of the fluid passage portions 63, 64 and through one side of the channel 44 into one or the other of the guide channels 60. Fluid in the guide channels 60 is prevented from escaping therefrom to the exterior of the base structure 23 by the extended notched end portions of the band 49, as shown by broken lines in FIG. 8. Also, as shown by broken lines in FIG. 4, the notches 59 are adapted to receive the drive arm member 46 so as to permit the drive arm member 46 to be moved to an extreme position. The peripheral flange 28 confines any hydraulic liquid which might escape from the interior of the mechanism, so that the liquid may seep back into the interior thereof. By manipulation of the pump operating handles 37, in unison or separately, the spherical body 42 may be rotated to swing the drive arm member 42 in any direction radially of the common center of the body 42 and seat 26, this movement being limited only by engagement of the drive member 46 with the retainer member 25 or its flange 28.

It will be appreciated that a duplicate of the above-described servo mechanism may be substituted for the pumps 34 and 35 and manually operated to cause the drive arm member 46 of the servo mechanism to partake of the same movements as that of the manually operated mechanism. Further, the servo mechanism may be situated at a remote distance from the pumps 34 and 35 or other operating mechanism.

MODIFICATION OF FIGS. 10-16

In the form of the invention illustrated in FIGS. 10-16, a generally spherical body 42a, similar to the body 42, is rotatably mounted in a base structure 23a comprising a base member 24a and an annular retainer member 25a. The base member 23a is generally similar to the base member 23, differing therefrom in including a diametrically enlarged portion 68 that defines a toothed annular surface 69 and an axially extending circumferential flange 70 radially outwardly of the toothed surface 69. The retainer member 25a is provided with a fluid retainer flange 28a and is secured to the base member 24a by machine screws or the like 29a. As shown particularly in FIGS. 13 and 14, the body 42a is provided with channels 43a and 44a which receive respective trunnions 48a and 65a.

A drive arm member 71 is shown as having an integrally formed radially inner end 72 that is rotatively mounted in the body 42a and held therein by a hollow retaining nut 73. Intermediate its ends, the drive arm member 71 is formed to provide a cross sectionally rectangular or square portion 74 on which is longitudinally slidably mounted a slide 75 that is rectangular in outline and which is provided with radially outwardly projecting pairs of guide pins 76 and 77.

A pair of arcuate guide bars 78 and 79 are disposed in concentric encompassing relation to the body 42a outwardly of the base structure 23a, and are formed to provide longitudinally or circumferentially extending slots that slidably receive the slide 75. It will be noted that the guide pins 76 of each pair thereof slidably engage the radially inner and outer surfaces of the guide bar 78, whereas the guide pins 77 of each pair thereof slidably engage radially inner and outer surfaces respectively of the guide bar 79. The base member 23a and retainer member 25a are formed to provide a radially outwardly opening circumferential groove 81 that slidably receives a pair of superposed rings 82 and 83 each having respective diametrically opposed stub shafts 84 and 85 projecting radially outwardly therefrom and through circumferentially extending slots 86 in the opposite end portions of the guide bars 78 and 79.

As shown particularly in FIG. 16, the extreme ends of the guide bars 78 and 79 are formed with a single tooth 87 that has meshing engagement with one of the teeth of the toothed surface 69 when the guide bars 78 and 79 are positioned as shown in FIGS. 10 and 11 with the drive arm member 75 disposed on the common axis of the rings 82 and 83 and normal to the plane of the surface 27a of the base member 24a. The purpose of the cross sectionally rectangular or square intermediate portion 74 of the drive arm member 71, slide 75 and guide bars 78 and 79, together with engagement of the teeth 87 with the toothed surface 69, is to prevent the drive arm member from rotating on its own axis when it is disposed in its position of FIGS. 10 and 11. Each guide bar is formed to provide a pair of laterally spaced lugs 88 that engage the flange 70 to move the teeth 87 out of engagement with the toothed surface 69 when the body 42a is rotated in any direction away from the position thereof illustrated in FIGS. 10, 11, 13 and 14. When the body 42a is thus rotated, the guide bars 78 and 79 are permitted to rotate with their respective rings 82 and 83, so that the drive arm member 71 may be pointed in any direction within its limits but held against rotation on its own axis. The slots 86, being elongated in directions longitudinally of their respective guide bars 78 and 79, permit the teeth 87 to be withdrawn from engagement with the toothed surface 69 as soon as the drive arm member 71 is moved from its position of FIGS. 10 and 11. Once the drive arm member 71 is moved away from its position of FIGS. 10 and 11, the drive arm member will no longer be coaxial with the rings 82 and 83, and will be held against rotation by the guide arms 78 and 79. As soon as either guide arm 78 or 79 is moved out of a position normal to its respective ring 82 or 83, the rings will not be able to rotate about the common axis thereof, and the drive arm 71 will remain fixed against rotation on its own axis.

MODIFICATION OF FIG. 17

The drive arm member of FIG. 17, indicated at 71a, differs from the drive arm member 71 only be having its outer end portion screw threaded, as indicated at 89, to receive an adjustment nut 90 that engages one end of a coil compression spring 91 the other end of which engages the slide 75. The weight of the slide 75 and the guide bars 78 and 79, in the arrangement of FIGS. 10–14, rely on their own weight to cause the teeth 87 to engage the toothed surface 69 when the drive arm member is in its position of FIGS. 10 and 11 coaxial with the rings 82 and 83. Use of the spring 91 insures that such tooth engagement will take place. This arrangement permits the servo unit to be disposed at any desired angle with respect to the vertical.

MODIFICATION OF FIGS. 18–21

In the embodiment of servo mechanism illustrated in FIGS. 18–21, the spherical body 42a is rotatively mounted in a base member 24b and is held in place by an annular retainer member 25a, the body 42a and retainer member 25a being identical to those of FIGS. 10–14. Internally, the base member 24b is identical to the base members 24 and 24a, the base member 24b having somewhat different exterior construction. This form of servo mechanism utilizes a pair of trunnions 48a and other trunnions 65a similar to the trunnions 48 and 65 respectively. The base member 24b and retainer member 25a cooperate to define a radially outwardly opening circumferential channel or groove 81b for sliding reception of axially inner and outer rings 92 and 93 respectively, each of which have diametrically opposed radially outwardly projecting stub shafts 94 on which are pivotally mounted the outer end portions of respective guide bars 95 and 96 similar to the guide bars 78 and 79.

The bottom portion of the base member 24b is formed to provide an annular shoulder having circumferentially spaced teeth 97 similar to the teeth of the toothed surface 69 of the base member 24a. The teeth 97 are adapted to have meshing engagement with cooperating gear teeth 98 on an annular ring 99 that loosely encompasses the lower end portion of the base member 24b. An annular shield 100 is secured to the lower end of the base member 24b, and loosely surrounds the ring 99. Each of the guide bars 95 and 96 is provided with a pair of anchoring pins 101 to which is anchored one end of one of a pair of flexible cables 102. The cables 102 extend downwardly from the anchoring pins 101 through openings 103 in the ring 99, and are entrained over pulleys 104 rotatively mounted on the ring 99. It will be noted that each cable has one end secured to the anchoring pin 101 of the guide bar 95, and its other end secured to the anchoring pin 101 of the guide bar 96. It will be further noted that the anchoring pins 101 are spaced from their respective stub shafts 94 so that, when the guide bars 95 and 96 are positioned to hold the drive arm member 71 is a position coaxial with the rings 93 and 94, as shown in FIGS. 18 and 19, the anchoring pins 101 are disposed directly above their respective stub shafts 94. The cables 102 are of such length that, when the guide bars 95 and 96 are positioned as shown in FIGS. 18–20, the cables 102 hold the ring 99 in a raised position with the teeth 98 thereof having meshing engagement with the teeth 97 of the base member 24b. Thus, the rings 92 and 93 are constrained against rotation, whereby to hold the drive arm member 71 against rotation on its own axis when positioned as shown in FIGS. 18 and 19. As soon as the body 42a is caused to rotate in any direction, the drive arm member 71 will impart swinging movements to one or both of the guide bars 95 and 96 about the axes of their respective stub shafts 94, causing the cables 102 to slacken and disengage the teeth 98 from the teeth 97, as shown in broken lines in FIG. 20. With the teeth thus disengaged, the rings 92, 93 and 99 are free to rotate about the center of the body 42a and axis of the rings 92 and 93. It will be appreciated that the teeth 97 and 98 are very shallow, so that only a slight tilting movement of either guide bar 95 or 96 is necessary to cause disengagement of the teeth 97 and 98.

While I have shown and described several forms which the present servo mechanism may take, it will be understood that the same is capable of further modification without departure from the spirit and scope of the invention, as defined in the claims.

What is claimed is:

1. A fluid-servo mechanism comprising:
    (a) a base structure defining a generally hemispherical seat and a pair of opposed radially inwardly opening circumferentially extending guide channels disposed in a plane passing through the radial center of said seat;
    (b) a generally spherical body rotatably mounted in seating engagement with said seat and having a pair of intersecting, radially outwardly opening channels extending circumferentially of said body and disposed in planes extending through the center of said body and normal to each other;

(c) a pair of trunnion elements mounted in said structure in said first mentioned plane and having portions thereof disposed in diametrically opposite portions of one of said radially outwardly opening channels;

(d) and a second pair of trunnion elements having portions disposed in said radially inwardly opening guide channels and other portions disposed in diametrically opposite portions of the other one of said radially outwardly opening channels;

(e) said base structure having fluid ports for connection to a source of fluid under pressure, and fluid passageways communicating with different ones of said ports and respective portions of said radially outwardly opening channels.

2. The servo mechanism defined in claim 1 in which said base structure comprises a base member and an annular body retaining member secured to said base member, said base and annular members cooperating to define said radially inwardly opening guide channels.

3. The servo mechanism defined in claim 2 in which said base and annular members cooperate to define a pair of diametrically opposed hemispherical recesses each disposed between adjacent ends of said inwardly opening channels, said first mentioned pair of trunnion elements being of spherical shape and rotatably seated in said recesses.

4. The servo mechanism defined in claim 1 in which said guide channels are semicircular in cross section, said trunnion elements being of spherical shape.

5. The servo mechanism defined in claim 1, further including a drive arm member carried by said body for rotational movement therewith and extending radially outwardly of said body for connection to a part to be moved by said drive member.

6. The servo mechanism defined in claim 5 in which said drive arm member comprises a shaft having an inner end portion journaled in said body, and in further combination with means carried by said base structure for holding said shaft against rotary movement on its own axis during rotation of said body relative to said base structure.

7. A fluid servo mechanism comprising:

(a) a base structure defining a generally hemispherical seat and a pair of opposed radially inwardly opening circumferentially extending guide channels disposed in a plane passing through the radial center of said sheet;

(b) a generally spherical body rotatably mounted in seating engagement with said seat and having a pair of intersecting radially outwardly opening channels extending circumferentially of said body and disposed in planes extending through the center of said body and normal to each other;

(c) a pair of trunnion elements mounted in said base structure in said first mentioned plane and having portions thereof disposed in diametrically opposite portions of one of said radially outwardly opening channels;

(d) and a second pair of trunnion elements having portions disposed in said radially inwardly opening guide channels and other portions disposed in diametrically opposite portions of the other one of said radially outwardly opening channels;

(e) said base structure having two opposed pairs of fluid ports for connection to a source of fluid pressure, a pair of fluid passageways communicating with one pair of said fluid ports and circumferentially spaced portions of one of said radially outwardly opening channels, and another pair of fluid passageways communicating with the other pair of said fluid ports and said radially inwardly opening guide channels, said radially inwardly opening guide channels communicating with circumferentially spaced portions of the other of said radially outwardly opening channels.

8. The fluid servo mechanism defined in claim 1 in which said guide channels and radially outwardly opening channels are cross sectionally semicircular, said trunnion elements being of spherical shape to rotatively fit said guide channels and said radially outwardly opening channels, said base structure defining a pair of semispherical recesses, the trunnion elements elements of said first mentioned pair thereof being rotatively seated in said recesses.

9. The fluid servo mechanism defined in claim 7 further including drive arm means extending radially of said body and having an inner end portion mounted in said body for rotation relative thereto on the axis of said shaft, said drive arm means having an outer end for connection to a part to be moved by said drive arm means.

10. The fluid servo mechanism defined in claim 9 further including guide means operatively engaging said drive arm means to hold the drive arm means against rotation on its own axis in all positions of rotary movement of said body and relative to said base structure, and mounting means for mounting said guide means on said base structure.

11. The fluid servo mechanism defined in claim 10 in which said guide means comprises a pair of arcuate guide bars each encompassing a portion of said body outwardly of said base structure, and having circumferentially extending guide surfaces thereon; said drive arm means including a slide having flat side portions engaging said guide surfaces; said base structure defining a guide track concentric with said seat, said guide channels and said body; and a pair of ring members concentrically disposed in said guide track for rotation therein; each of said guide bars having opposite end portions each having a generally pivotal connection to one of the diametrically opposite sides of a respective one of said ring members.

12. The fluid servo mechanism defined in claim 11, in further combination with locking means for releasably locking said ring members and their respective guide bars against rotation on the axis of said rings when said body and guide bars are rotatively moved to respective positions wherein the axis of said drive arm means is coincident with the axis of said ring members.

13. The fluid servo mechanism defined in claim 7 wherein said base structure defines a pair of opposed radially inwardly opening circumferentially extending fluid channels disposed in a plane in spaced parallel relation to said first mentioned plane, said last-mentioned pair of said fluid ports communicating with said guide channels through said radially inwardly opening fluid channels and said last-mentioned radially outwardly opening channels.

* * * * *